United States Patent
Kiyono et al.

(10) Patent No.: US 8,230,580 B2
(45) Date of Patent: *Jul. 31, 2012

(54) SPLIT STATOR MANUFACTURING METHOD

(75) Inventors: Takaaki Kiyono, Okazaki (JP); Hideaki Takahashi, Nagoya (JP); Koji Nakanishi, Konan (JP); Takeo Hayashida, Kikuchi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 55 days.

This patent is subject to a terminal disclaimer.

(21) Appl. No.: 12/811,856

(22) PCT Filed: Jan. 15, 2009

(86) PCT No.: PCT/JP2009/050413
§ 371 (c)(1), (2), (4) Date: Jul. 7, 2010

(87) PCT Pub. No.: WO2009/090971
PCT Pub. Date: Jul. 23, 2009

(65) Prior Publication Data
US 2010/0275436 A1  Nov. 4, 2010

(30) Foreign Application Priority Data
Jan. 16, 2008  (JP) .................................. 2008-007336

(51) Int. Cl.
*H02K 15/00* (2006.01)

(52) U.S. Cl. ............................................ 29/596; 310/43
(58) Field of Classification Search ............ 29/596–598; 310/216, 259; 264/272.15, 272.19, 272.2
See application file for complete search history.

(56) References Cited

U.S. PATENT DOCUMENTS

| | | | | |
|---|---|---|---|---|
| 2,711,492 | A * | 6/1955 | Ballman | 310/216.132 |
| 7,696,667 | B2 * | 4/2010 | Tatebe | 310/216.102 |
| 2007/0114878 | A1 * | 5/2007 | Tatebe | 310/259 |
| 2010/0187918 | A1 * | 7/2010 | Takahashi et al. | 310/43 |
| 2011/0012445 | A1 * | 1/2011 | Nakanishi et al. | 310/43 |

FOREIGN PATENT DOCUMENTS

| | | |
|---|---|---|
| JP | 11-252842 A | 9/1999 |
| JP | 2000-333399 A | 11/2000 |
| JP | 2001-211587 A | 8/2001 |
| JP | 2007-143324 A | 6/2007 |
| JP | 2009-072055 A | 4/2009 |

* cited by examiner

*Primary Examiner* — Minh Trinh
(74) *Attorney, Agent, or Firm* — Kenyon & Kenyon LLP

(57) ABSTRACT

Disclosed is a split stator manufacturing method, which is enabled to enhance a production efficiency and to charge a thermoplastic resin between an insulator and a coil by molding the resin. The split stator manufacturing method comprises a setting step of setting an insulator and a split stator core element in a stationary mold and setting an edgewise coil in a movable mold, a resin injecting step of injecting a resin into a cavity with the stationary mold and the movable mold being half-opened, and a clamping step of clamping the stationary mold and the movable mold.

11 Claims, 15 Drawing Sheets

SPLIT STATOR MANUFACTURING METHOD

This is a 371 national phase application of PCT/JP2009/050413 filed 15 Jan. 2009, claiming priority to Japanese Patent Application No. 2008-007336 filed 16 Jan. 2008, the contents of which are incorporated herein by reference.

FIELD OF THE INVENTION

The present invention relates to a method of manufacturing a split stator of a motor, suitable for manufacture with short takt time.

BACKGROUND OF THE INVENTION

There is known a method of manufacturing a stator by making a stator core of laminated steel plates each farmed by press punching, mounting a winding thereon, and coating a winding part and others with resin by injection molding.

On the other hand, there is also known another method of manufacturing a stator by using split stator members each including a split stator core element attached with a winding. Those split stator members are combined in one assembly with a shrink fit ring.

Patent Literature 1 discloses a method of manufacturing a split stator member by coating a split core element by resin molding.

Specifically, it is disclosed that a winding is wound around a split core element having one teeth portion, the wound coil is pressed toward a central axis of the teeth portion and shaped by a press die and simultaneously resin molding is performed by injecting resin into an injection molding mold doubling as the press die.

This technique advantageously could increase a space factor of the coil. Furthermore, it is only necessary to coat only the coil with resin. The technique also advantageously could reduce an amount of resin used for the resin molding as compared with a conventional stator.

CITATION LIST

Patent Literature

JP 2007-143324 A

SUMMARY OF INVENTION

Technical Problem

However, the invention disclosed in Patent Literature 1 would have the following disadvantages.

Concretely, Patent Literature 1 has no description relating to an insulator. If an insulator has been placed between the split core element and the winding, the winding is pressed by the press die and thus the resin could not enter between the insulator and the winding during injection molding. In a finished stator, the insulator and the winding are likely to directly contact with each other.

On the other hand, downsizing of a motor of a hybrid electric vehicle advances, showing a tendency of increasing a working current range. In this case, the amount of heat of the winding increases. Heat dissipation becomes more important because an enamel coating of the winding has an upper temperature limit.

Accordingly, it is necessary to bring the insulator and the stator core element in close contact with each other and particularly supply high heat-conductive resin between the insulator and the winding. This is because the heat has to be dissipated to a stator core side through a resin molded portion and the insulator.

In the case of using heat-hardening resin as a resin molding material, hardening takes several minute. Accordingly, it may be arranged to pressurize the resin to be injected to thereby cause the resin to enter between the insulator and the winding.

However, for example, if thermoplastic resin heated to a molten state at 300° C. is used to shorten a takt time to thereby enhance production efficiency, the resin is cooled and hardened in several tens of seconds by a mold heated at about 150° C. On the other hand, the thermoplastic resin has a viscosity of 100 Pa·sec, which is 20 to 100 times higher than the heat-hardening resin. The several tens of seconds are insufficient for the molten resin to sufficiently enter in a narrow gap. This causes a filling failure or shortage between the insulator and the winding.

The present invention has been made to solve the above problems and has a purpose to provide a method of manufacturing a split stator member including resin molding with thermoplastic resin to enhance production efficiency and surely fill the rein between an insulator and a winding.

Solution to Problem (1) To achieve the above purpose, the invention provides a split stator manufacturing method comprising the steps of: setting an insulator and a split core element in a first mold and setting a formed coil in a second mold; injecting resin in a cavity while the first mold and the second mold are in a half-open state; and clamping the first and second molds together while keeping fluidity of the resin.

(2) In the split stator manufacturing method set forth in (1), preferably, the mold clamping step is started in process of the resin injecting step.

(3) The split stator manufacturing method set forth in (1), preferably, further comprises the step of compressing the injected resin by only the formed coil between the resin injecting step and the mold clamping step.

(4) In the split stator manufacturing method set forth in (3), preferably, the compressing step and the mold clamping step are started in process of the resin injecting step.

(5) In the split stator manufacturing method set forth in (3) or (4), preferably, the formed coil is vibrated in a direction of moving closer to or away from the insulator.

(6) In the split stator manufacturing method set forth in one of (1) to (5), preferably, the resin is thermoplastic resin.

Advantageous Effects of Invention

Next, operations and advantages of the split stator manufacturing method of the invention having the above configurations will be explained.

In the first step of the split stator manufacturing method of the invention, the split core element is set in the first mold (e.g., a fixed mold) and further the insulator is set on the split core element. On the other hand, the formed coil (e.g., a formed edgewise coil) is set in the second mold (e.g., a movable mold).

While the first mold and the second mold are in the half-open state, molten resin for resin molding is injected into the cavity defined between the first and second molds. This can temporarily form a space between the formed coil and the insulator, thereby allowing the molten resin to flow in the space between the formed coil and the insulator at that timing.

Then, the first mold in which the insulator is set on the split core element and the resin is injected over the insulator and the second mold in which the fanned coil is set are clamped.

As the first mold and the second mold move closer, the resin is pressed to flow upward in the space between the formed coil and the insulator by use of inclination. Accordingly, the formed coil moves into the molten resin supplied on the insulator, the mold clamping can be conducted while the molten resin exists between the insulator and the coil.

Consequently, the stator coated by resin molding can include the resin reliably filled between the insulator and the coil.

Since the molten resin is injected while the first mold and the second mold are in the half-open state, resin pressure can be reduced and thus deformation of the coil and others is reduced.

Herein, the mold clamping step is started in process of the resin injecting step. Thus, while the first mold and the second mold are clamped together, the resin is injected. This causes the resin to more efficiently flow between the insulator and the coil. Specifically, when the resin is first injected and then the mold clamping is performed, the resin is accumulated on the insulator and the coil moves therein. However, only small gaps finally exist between the insulator and the coil and therefore, in some cases, the resin could not flow into upper gaps. In this regard, since the resin is being injected during the mold clamping step, the resin can be reliably filled in small gaps between the insulator and the coil. In particular, it is preferable to continue resin injection to the end of the mold clamping step.

Furthermore, the compressing step is provided to compress the injected resin by only the formed coil between the resin injecting step and the mold clamping step. Accordingly, it is possible to move only the coil into the molten resin accumulated on the insulator, thereby reliably filling the resin in small gaps between the insulator and the coil.

Moreover, the compressing step and the mold clamping step are started in process of the resin injecting step. Accordingly, while the resin is being injected, the coil is moved in the injected resin, so that the resin can be filled more efficiently and more reliably in small gaps between the insulator and the coil.

Moreover, the formed coil is vibrated in the short-side direction of the coil while the formed coil is moved into the molten resin. This can increase the fluidity of the resin. In general, resin has a high viscosity and hence is hard to flow when sticks to the surface of the edgewise coil.

In the invention, however, firstly, the gaps between the insulator and the formed coil are changed and thus the resin is made easy to flow. Secondly, the resin is vibrated in a direction that separates the resin from the surface of the edgewise coil. Accordingly, the resin is unlikely to stick to the surface of the edgewise coil, increasing the fluidity of the resin.

This makes it possible to reliably fill even the resin having low fluidity such as thermoplastic resin in small gaps between the insulator and the edgewise coil. Herein, the vibration in the short-side direction of the coil is generated by for example an ultrasonic generating horn.

In the case where the resin is thermoplastic resin, particularly, the fluidity is low. It is therefore difficult to reliably fill the resin in small gaps between the insulator and the coil. On the other hand, according to the above invention, even when the thermoplastic resin is used, the resin can be reliably filled in small gaps between the insulator and the coil.

Specifically, thermoplastic resin has a melt viscosity of about 100 Pa·sec and heat hardening resin has a melt viscosity of about 1 to 5 Pa·sec. Thus, the thermoplastic resin has poor fluidity twenty times lower than the thermoplastic resin. In addition, the thermoplastic resin needs heating to harden even when it is injected in a mold heated at about 150° C. Such hardening takes about 2 to 3 minutes. On the other hand, when the thermoplastic resin heated at about 300° C. is injected into the mold heated at about 150° C., it is cooled and hardens in several tens of seconds.

In the case of using the thermoplastic resin, accordingly, the conventional manufacturing method could not surely fill the resin in small gaps between the insulator and the coil.

To the contrary, according to the invention, even when the thermoplastic resin is used as a material, the resin can be reliably filled in small gaps between the insulator and the coil.

REFERENCE SIGNS LIST

Figure 1:
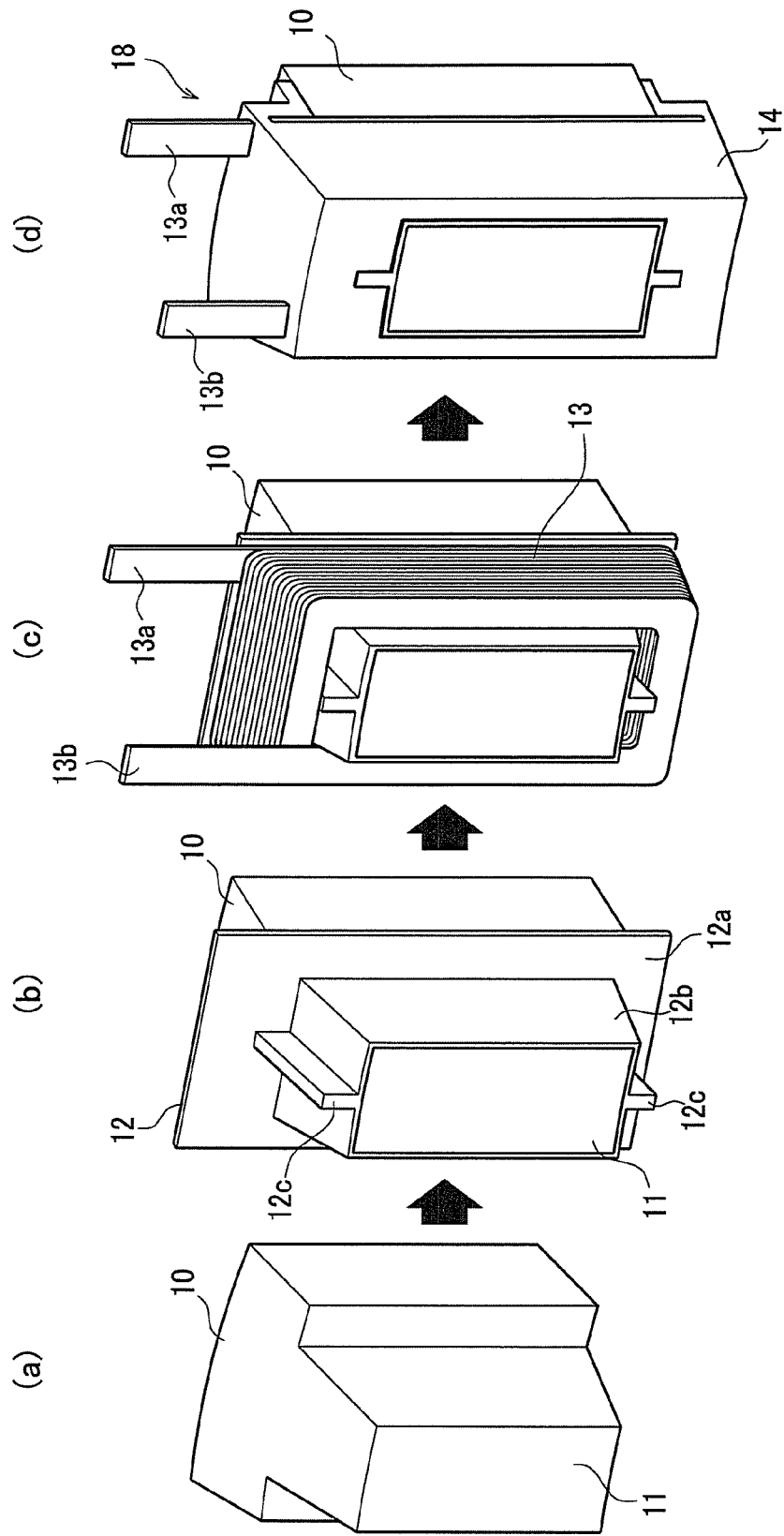
FIG. 1 is a view showing a manufacturing procedure of a split stator.

10 Split stator core element
11 Teeth portion
12 Insulator
13 Edgewise coil
13a, 13b Long end
18 Split stator member
20 Coil holding block 21 Fixed mold
21a, 21b Slide mold
21c Guide mold
21d Fixed-mold main body
22 Movable mold
22a Protruding portion

DETAILED DESCRIPTION

A detailed description of a preferred embodiment of a split stator and a split stator manufacturing method embodying the present invention will now be given referring to the accompanying drawings.

FIG. 1 shows a manufacturing procedure of a split stator member. A split stator core element ("core element") 10 includes a teeth portion 11 on which a formed coil is mounted. The core element 10 is formed of steel plates made by press punching and laminated in layers. Herein, the core element 10 is designed so that eighteen core elements are assembled into an annular stator core. In FIG. 1, (a) shows the core element 10 and (b) shows a state where an insulator 12 is set on a teeth portion 11 of the core element 10. The insulator 12 includes a sleeve part 12b covering the teeth portion 11, a cover part 12a covering an inner surface portion of the teeth portion 11 of the core element 10 excepting a protruding portion and vertically extending, and two ribs 12c protruding upward and downward from the sleeve part 12b respectively. Herein, the insulator 12b has a side wall thickness of 0.2 to 0.3 mm.

In FIG. 1, (c) illustrates a state where a formed edgewise coil 13 is mounted on the teeth portion 11 through the sleeve part 12b of the insulator 12. The edgewise coil 13 is made of a coil wire having a flat rectangular cross section and is formed to have inner sides according to the shape of the teeth portion 11.

The edgewise coil 13 is held in close contact with the core element 10 through the cover part 12a. The edgewise coil 13 is positioned in a lateral direction by the teeth portion 11 through the sleeve part 12b and in a vertical direction by the protrusions 12c of the insulator 12. Thus, the edgewise coil 13 is located in place with respect to the core element 10. The edgewise coil 13 includes a long end 13a protruding upward near the cover part 12a and another long end 13b protruding upward near an end face of the teeth portion 11.

This embodiment exemplifies the edgewise coil 13 as a formed coil. As alternatives, any other coils each having a finished form may be adopted irrespective of circular or rectangular in cross section.

Figure 3:
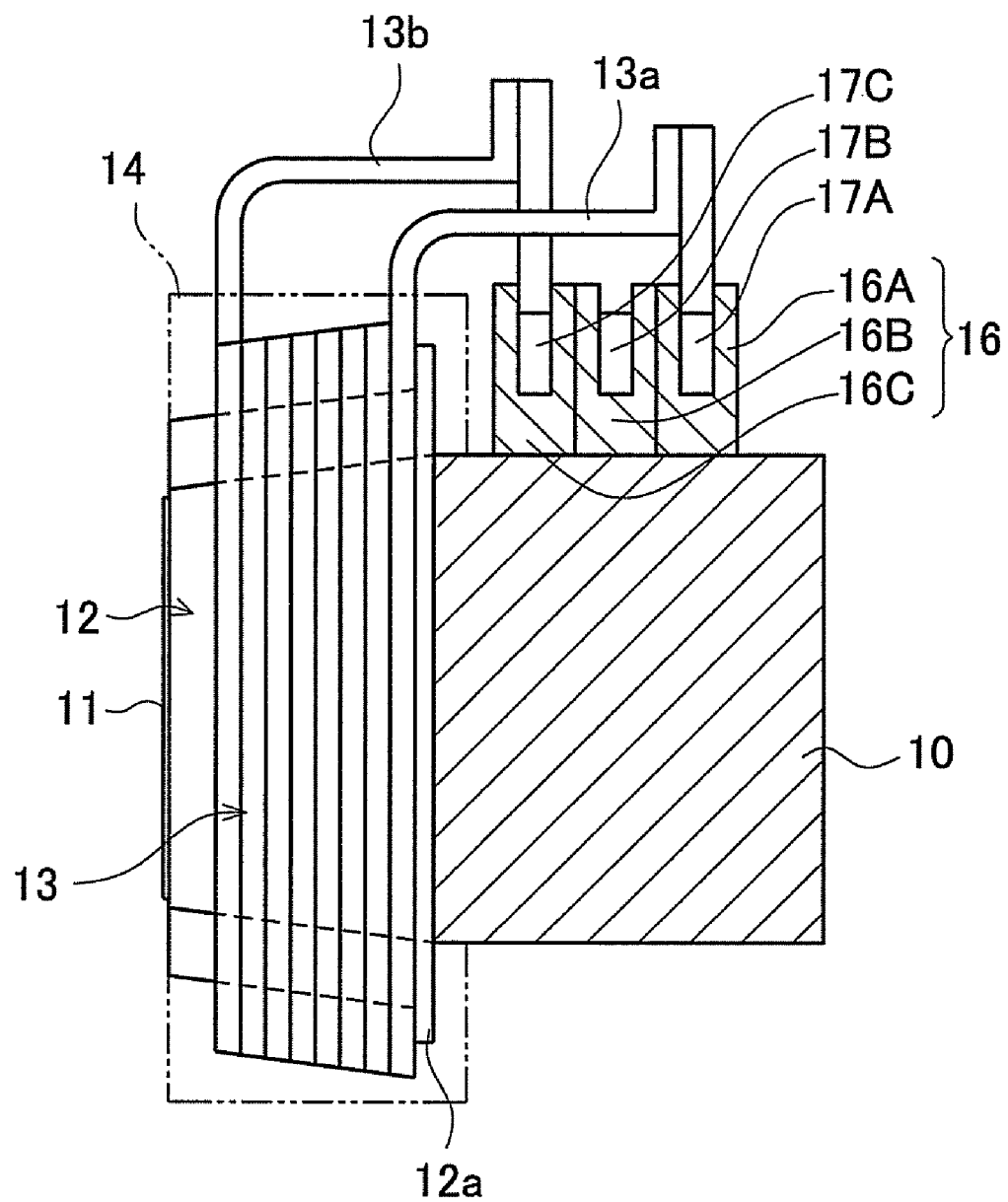
FIG. 3 is a sectional view of a split stator member.

In FIG. 1, (d) shows a resin-molded split stator member 18 in which a resin molded portion 14 is formed around the edgewise coil 13 shown in (c). A method of forming the resin molded portion 14 will be explained later in detail. The pair of long ends 13a and 13b protrudes from the resin molded portion 14 of the split stator member 18. FIG. 3 shows a sectional view of the resin-molded split stator member 18. This sectional view shows a positional relationship between the edgewise coil 13 and the resin molded portion 14.

The edgewise coil 13 is mounted on the core element 10 through the insulator 12 and the resin molded portion 14 is formed only around a coiled portion of the edgewise coil 13. FIG. 3 shows a state where bus bar holders 16 (16A, 16B, 16C) made of resin for holding bus bars 17 (17A, 17B, 17C) are attached on the core element 10. The long ends 13a and 13b are connected to the bus bars 17.

Figure 2:
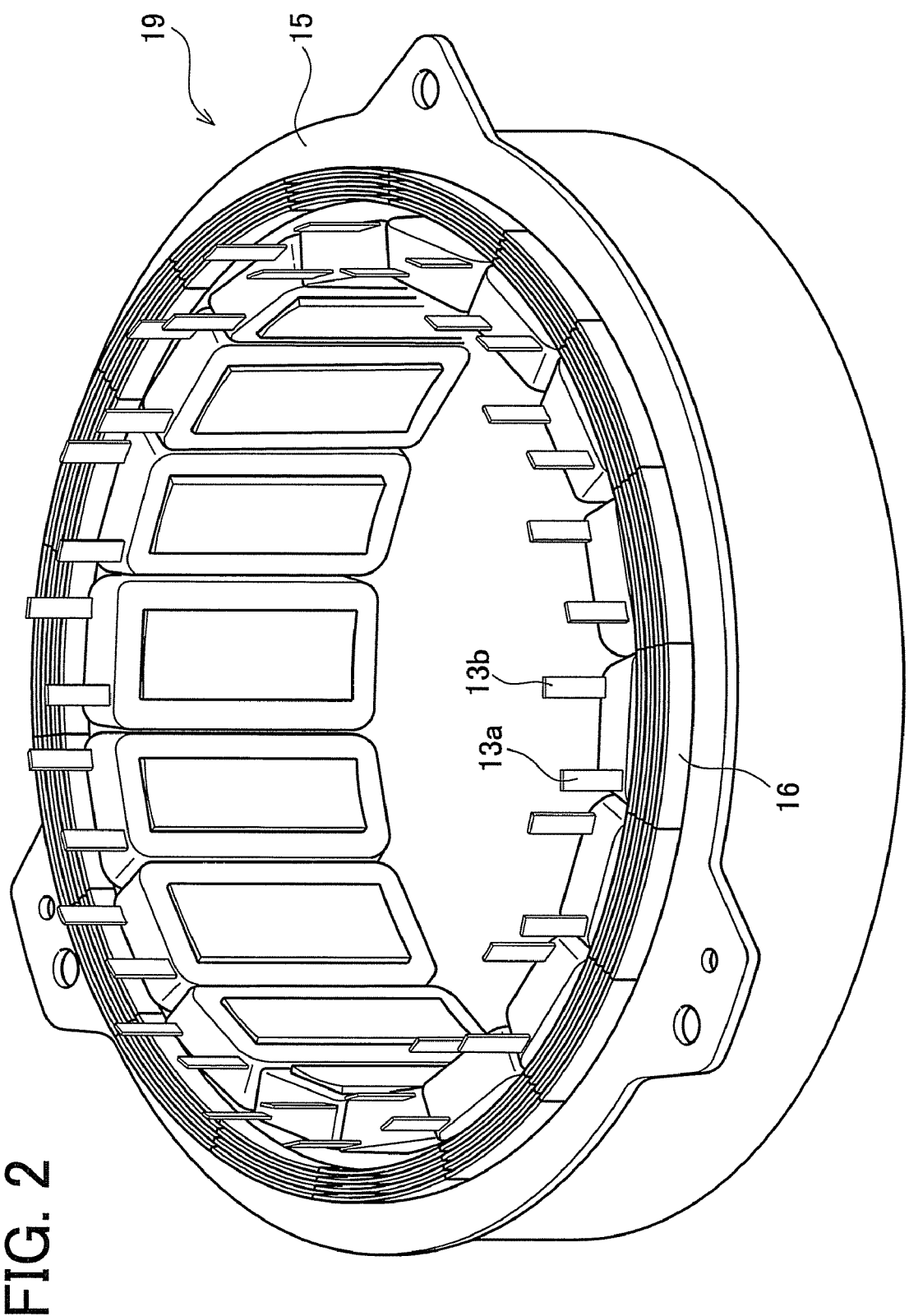
FIG. 2 is a view showing a stator assembled of eighteen split stator members shrunk fit by an outer ring.

FIG. 2 shows a stator 19 assembled of eighteen split stator members 18. Specifically, eighteen split stator members 18 are combined in annular form and attached from outside with an outer ring 15 that has been heated and expanded to have an enlarged inner diameter. When this assembly is cooled in room temperature and the inner diameter of the outer ring 15 contracts, the eighteen split stator members 18 are shrink fitted, integrally forming the stator 19. This is so-called shrink fitting of the outer ring.

In the next step, not illustrated, the long end 13a of one split stator member 18 is connected to the long end 13b of a third split stator member 18 by skipping two split stator members leftward, through the bus bar 17 in the bus bar holder 16. In this way, the long ends of eighteen split stator members 18 are sequentially connected through the bus bars 17 in the bus bar holders 16 to form three motor coils of U phase, V phase, and W phase.

Figure 12:
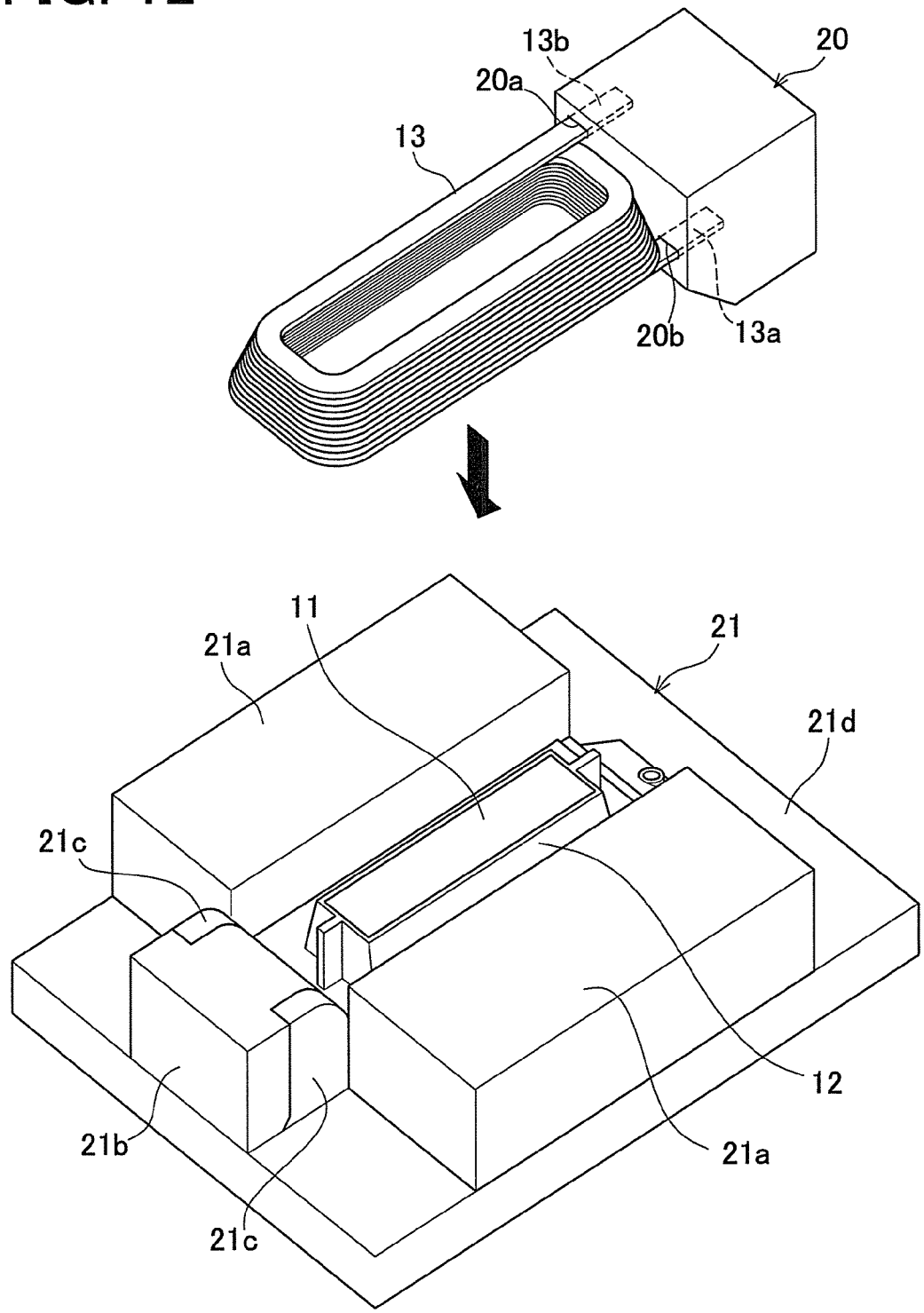
FIG. 12 is a view showing a relationship of the split stator core element and the insulator mounted in the fixed mold with respect to the edgewise coil.

Next, the split stator manufacturing method of the invention to manufacture the split stator member 18 will be explained. FIGS. 4 to 7 show steps in the first embodiment of the split stator manufacturing method of the invention. FIG. 12 shows a relationship between the core element 10 and the insulator 12 set in a fixed mold 21 and the edgewise coil 13.

Figure 4:
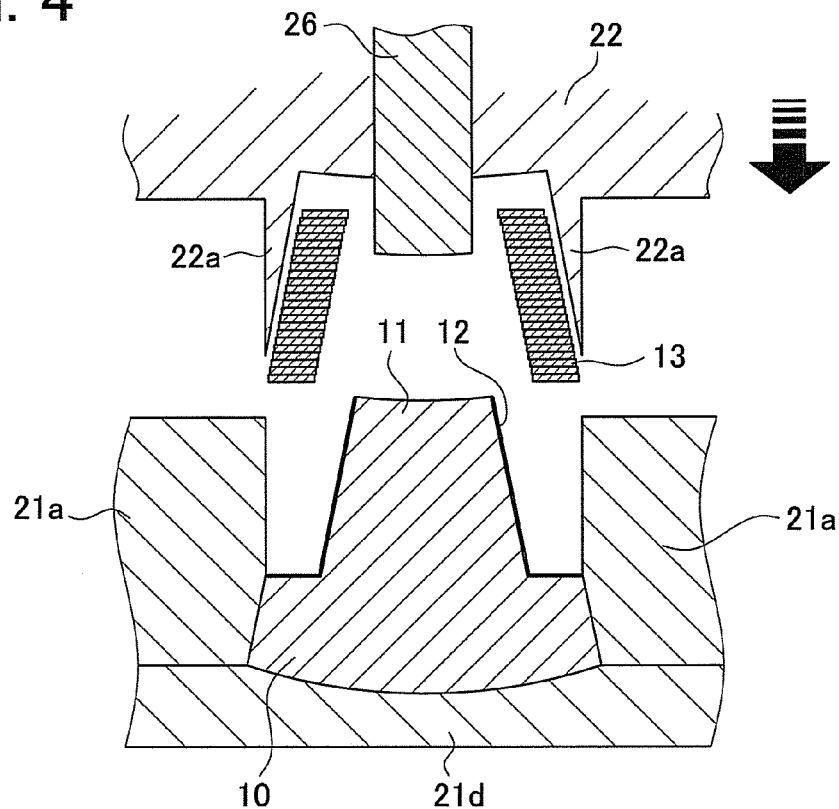
FIG. 4 is a view showing a first step in a first embodiment of the split stator manufacturing method of the invention.

A molding mold structure for forming the resin molded portion is first explained. As shown in FIGS. 4 and 12, the fixed mold 21 serving as a first mold includes a main body 21d, a pair of slide molds 21a which will hold the core element 10 from either side thereof, a pair of guide parts 21c protruding from the main body 21d, and a slide mold 21b slidable along the pair of guide parts 21c.

The core element 10 is sandwiched between the pair of slide molds 21a from either side and fixed by the slide mold 21b in a direction perpendicular to the holding direction of the slide molds 21a. On the teeth portion 11 of the core element 10, the insulator 12 is mounted.

Figure 10A:
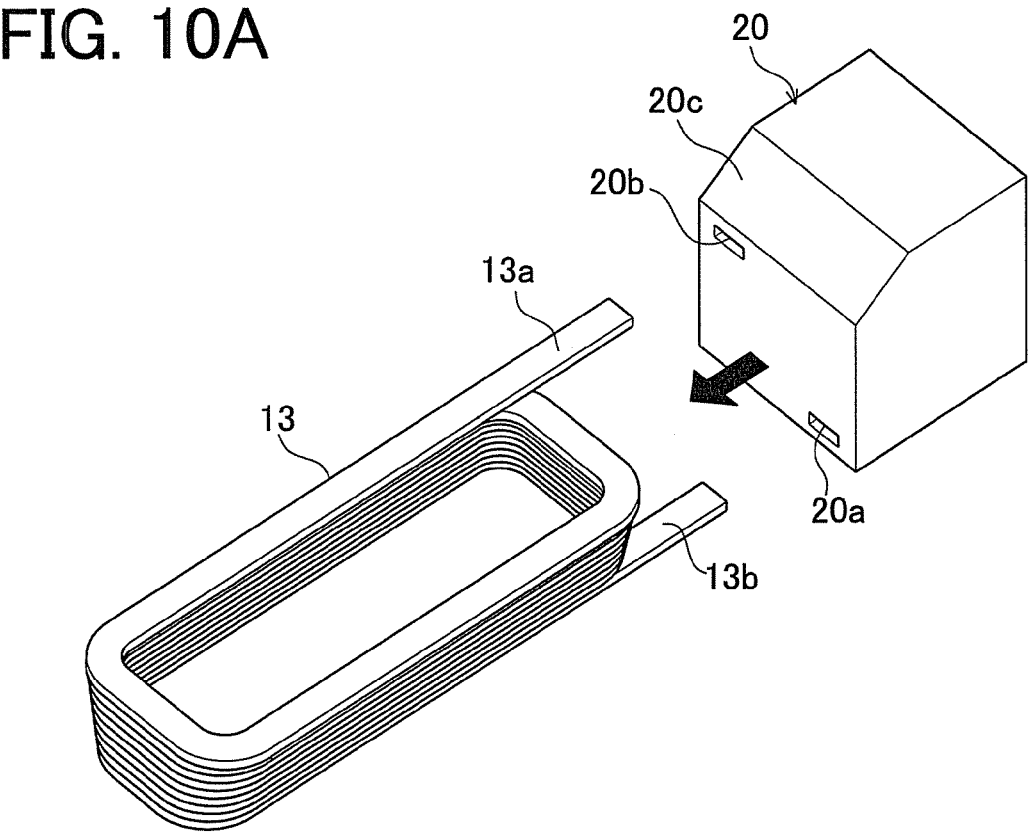
FIG. 10A is a perspective view showing a structure to hold the edgewise coil by a coil holding block.
Figure 10B:
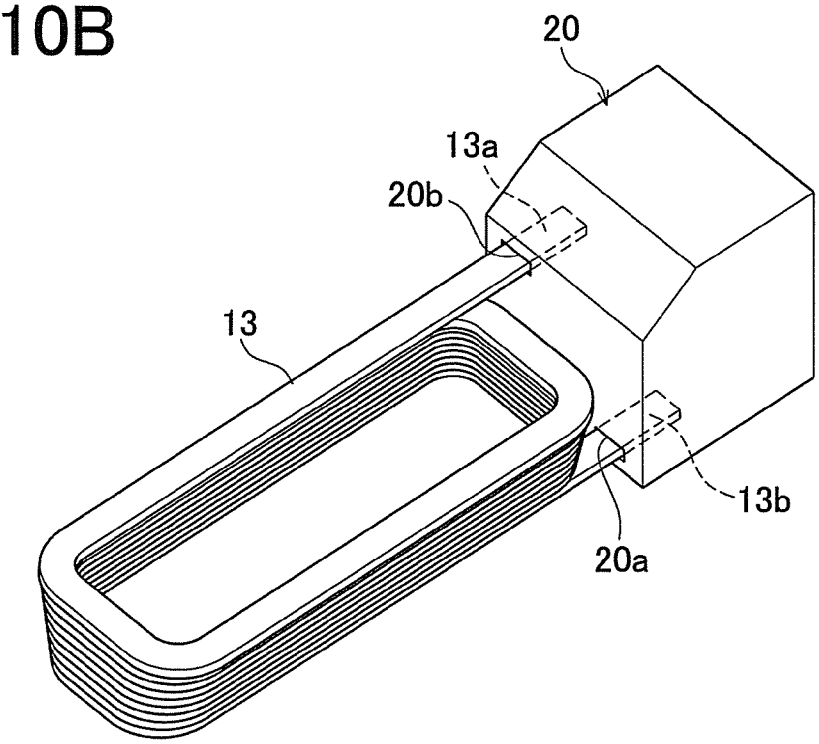
FIG. 10B is a perspective view showing a state where the coil holding block holds the edgewise coil.
Figure 11:
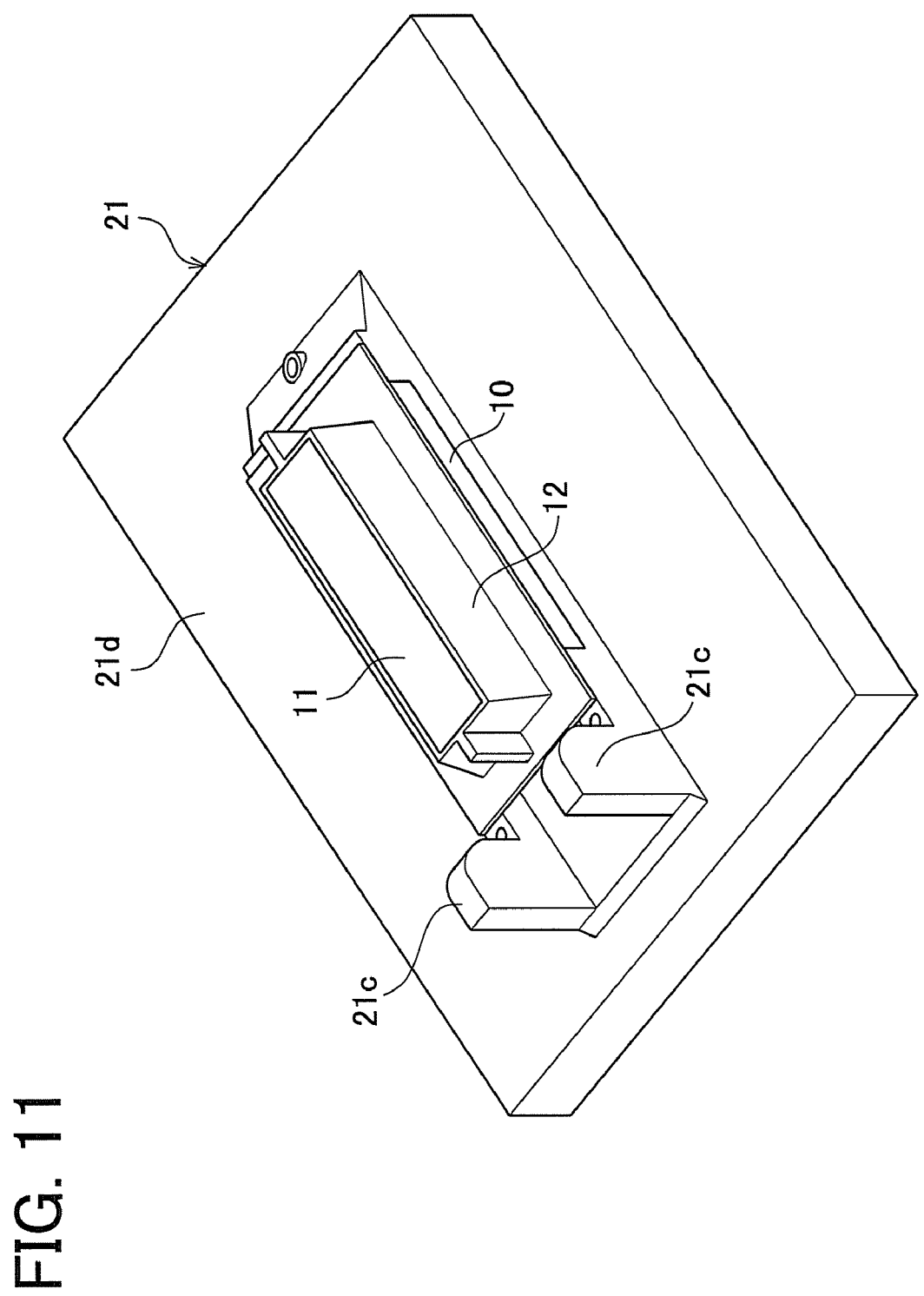
FIG. 11 is a view showing a state where a split stator core element and an insulator are mounted in a fixed mold.

On the other hand, FIGS. 10A and 10B show the shape of the formed edgewise coil 13. FIGS. 10A and 10B are perspective views showing a structure of a coil holding block 20 for holding the edgewise coil 13.

As shown in FIG. 10A, the edgewise coil 13 includes two long ends 13a and 13b. The almost cube-shaped coil holding block 20 is formed with holes 20a and 20b in which the long ends 13a and 13b of the edgewise coil 13 are inserted and fitted. This block 20 is further formed with a slant portion 20c on one side.

FIG. 10B shows a state where the end portions of the long ends 13a and 13b of the edgewise coil 13 are inserted and fitted in the holes 20a and 20b of the coil holding block 20. In a manufacturing step, many coil holding blocks 20 are prepared in such a way that the edgewise coils 13 are individually set in advance as in the state of FIG. 10B. After completion of a later molding step, the coil holding block 20 is collected and will be reused as a jig any number of times.

The fixed mold 21 and the movable mold 22 in this embodiment are configured as a laterally clamping mold in which the movable mold is horizontally moved.

While the core element 10 is fixed in the fixed mold 21 as shown in FIG. 4 and the movable mold 22 serving as an upper mold is fully opened, the coil holding block 20 is attached to the movable mold 22. Thus, the coil holding block 20 constitutes part of the movable mold 22 and the edgewise coil 13 is held in a position shown in FIG. 4, that is, at a distance of 1.5 mm apart from the movable mold 22 toward the fixed mold 21.

Figure 16:
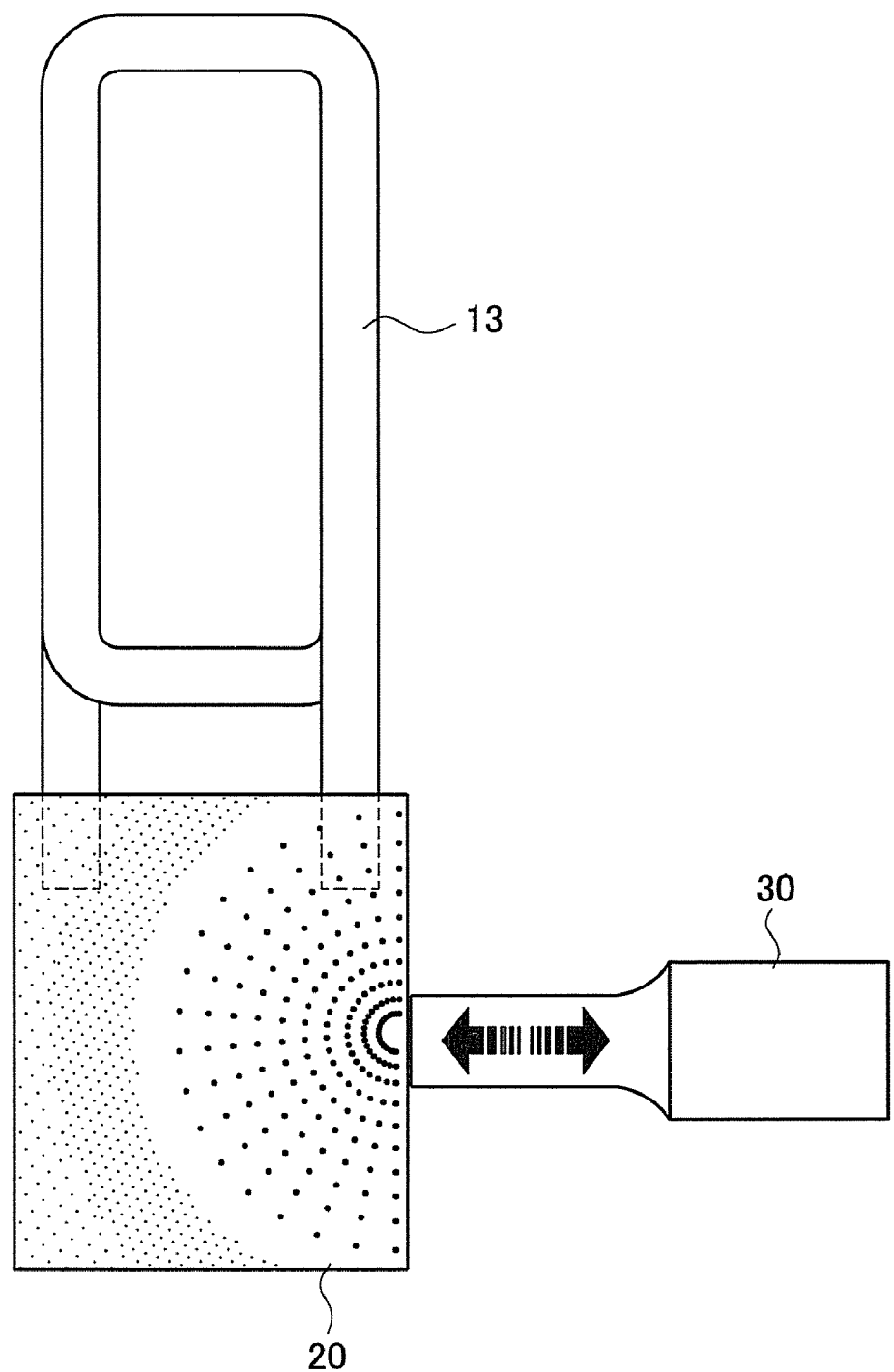
FIG. 16 is a view showing a relationship between the coil holding block and a ultrasonic generating horn.

As shown in FIG. 16, furthermore, the movable mold 22 is attached with an ultrasonic generating horn 30 in a position facing a side surface of the coil holding block 20.

The movable mold 22 is formed with a pair of protruding portions 22a each having an acute-angled triangular shape in section. The inner surfaces of the protruding portions 22a are located near the outer periphery of the edgewise coil 13 with a slight clearance therebetween.

Subsequently, the movable mold 22 is moved toward the fixed mold 21 into a half-open state shown in FIG. 5. In this half-open state, the fixed mold 21 and the movable mold 22 are apart by 3 mm from a fully closed position. In this state, the edgewise coil 13 is located in an intermediate position between the movable mold 22 and the fixed mold 21.

Figure 5:
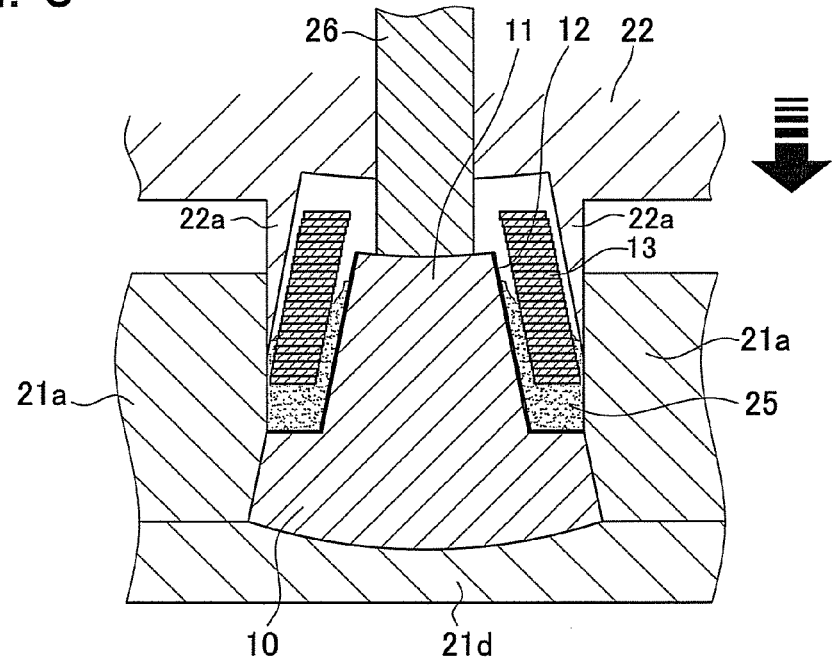
FIG. 5 is a view showing a second step in the first embodiment of the split stator manufacturing method of the invention.
Figure 15:
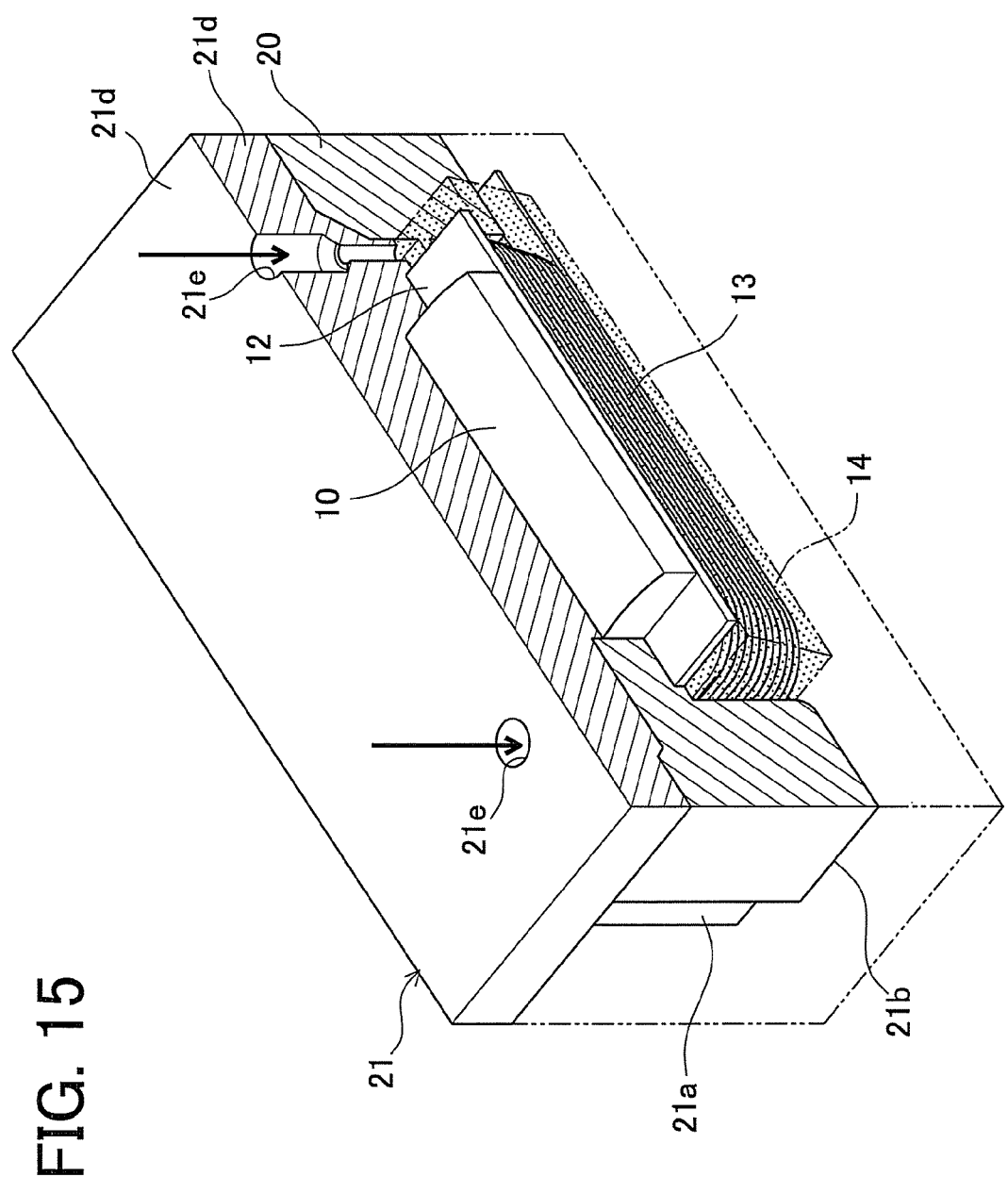
FIG. 15 is a partial sectional view showing a state where the fixed mold and the movable mold are clamped.

While the movable mold 22 is in the half-open state shown in FIG. 5, a resin injection device not shown starts injection of PPS resin 25 that is a thermoplastic resin molten at 320° C. into a cavity. The PPS resin 25 is injected and supplied into the cavity through two injection ports 21e formed in the fixed-mold main body 21d. The injection ports 21e are located outside of the insulator 12. The injected resin will flow over the insulator 12 to the center of each end of the edgewise coil 13 (in its longitudinal direction). FIG. 15 is a partial sectional view showing a state where the fixed mold 21 and the movable mold 22 are clamped.

The molds in this embodiment are a laterally clamping type and thus the injected resin flows in a longitudinal direction of the edgewise coil 13. In FIG. 5, the PPS resin 25 is illustrated for convenience but a flow pathway of the flowing PPS resin 25 is complicated.

Figure 13:
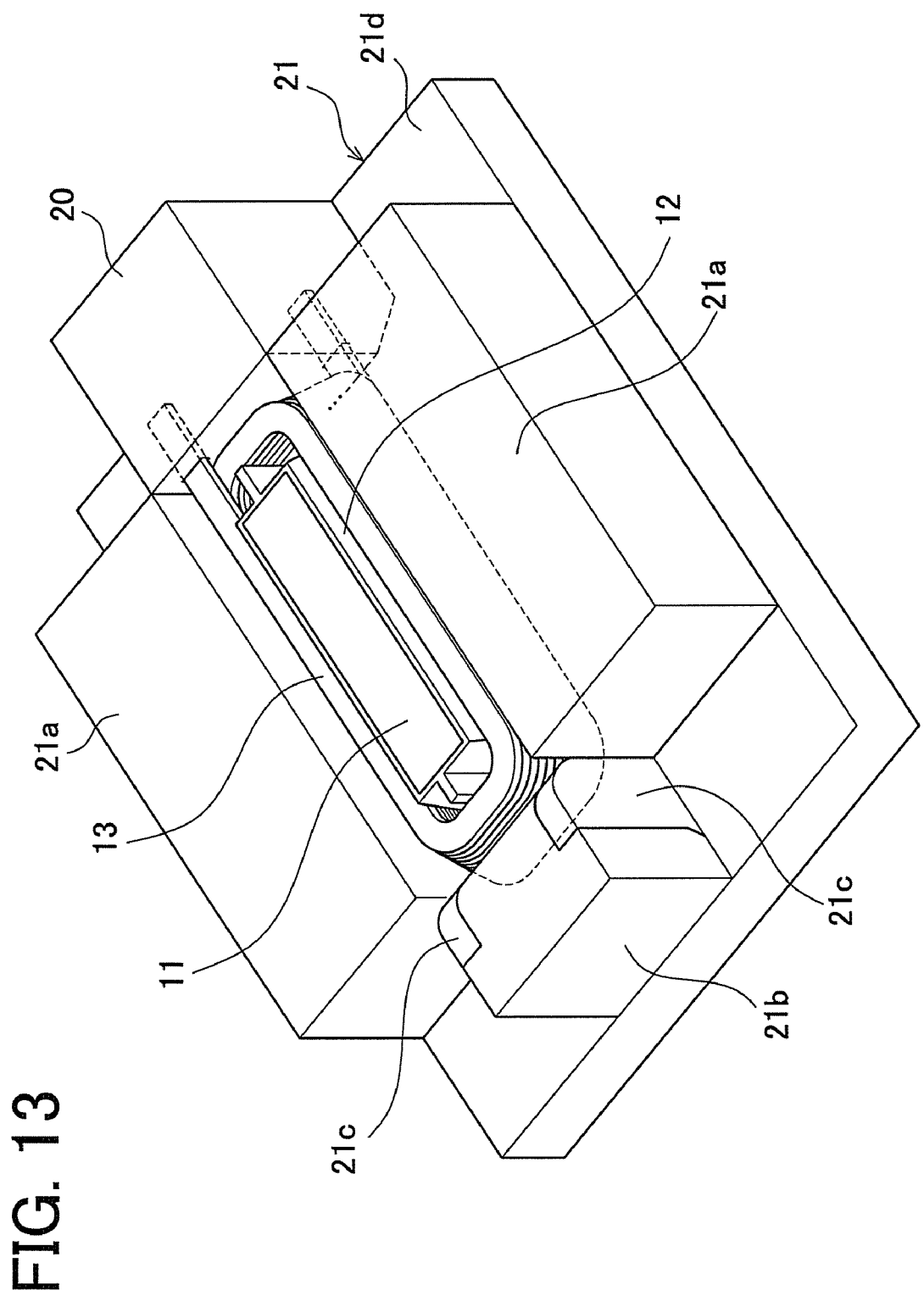
FIG. 13 is a view showing a state where the edgewise coil is mounted in the fixed mold.
Figure 14:
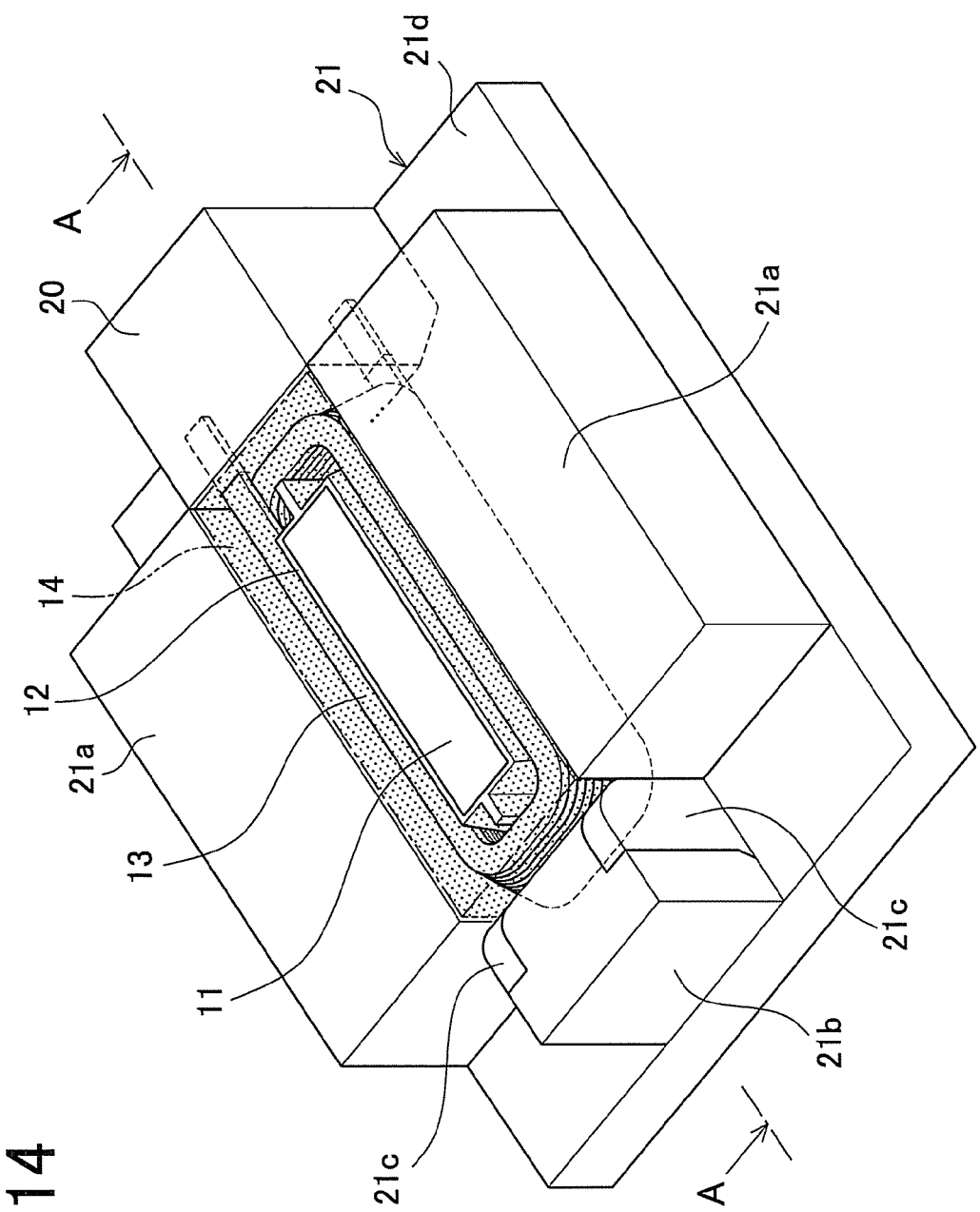
FIG. 14 is a view showing a state where the edgewise coil of FIG. 13 is coated with resin.

FIG. 13 is an imaginary view showing that the edgewise coil 13 is set in the fixed mold 21. FIG. 14 shows a state where the coil 13 of FIG. 13 is formed with the resin molded portion 14.

Figure 19:
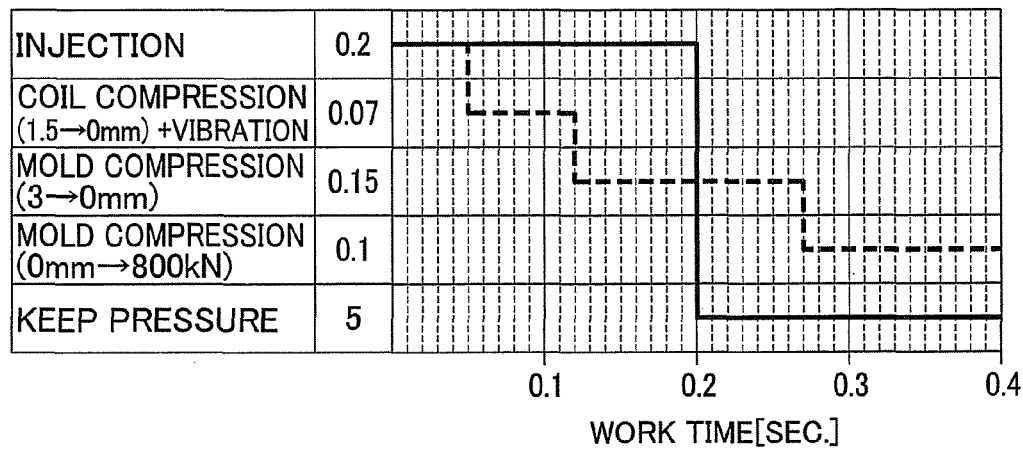
FIG. 19 is a time chart in the first embodiment.

FIG. 19 is a time chart of an injection step in the first embodiment. A total time period of the injection step is as very short as 0.2 second. Even though the fixed mold 21 and the movable mold 22 are heated at 150° C., the PPS resin 25 which is thermoplastic resin is hardened in short time. The total injection period is therefore set to a very short time.

Figure 6:
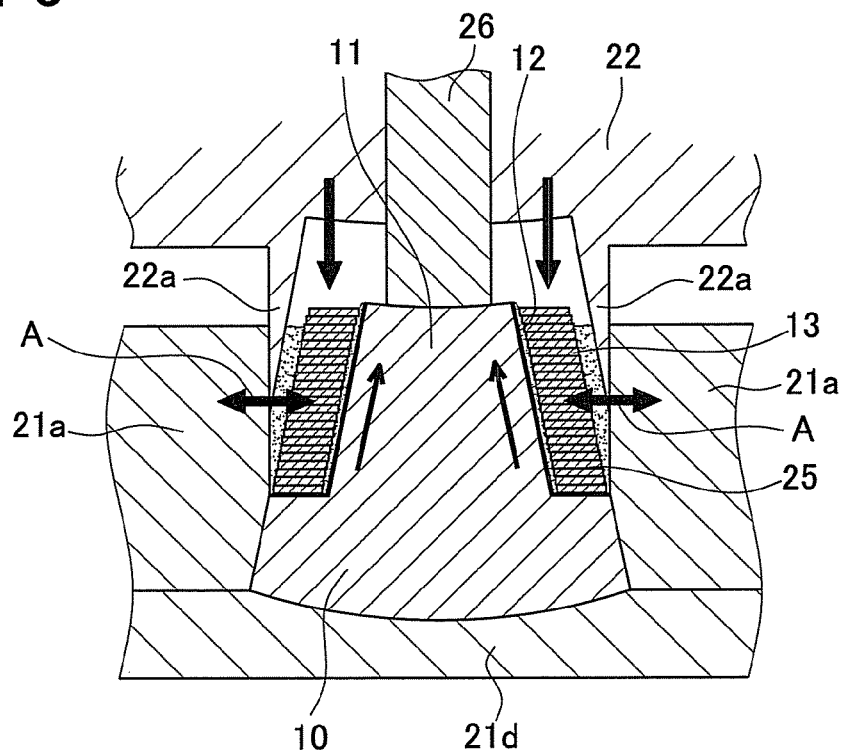
FIG. 6 is a view showing a third step in the first embodiment of the split stator manufacturing method of the invention.
Figure 7:
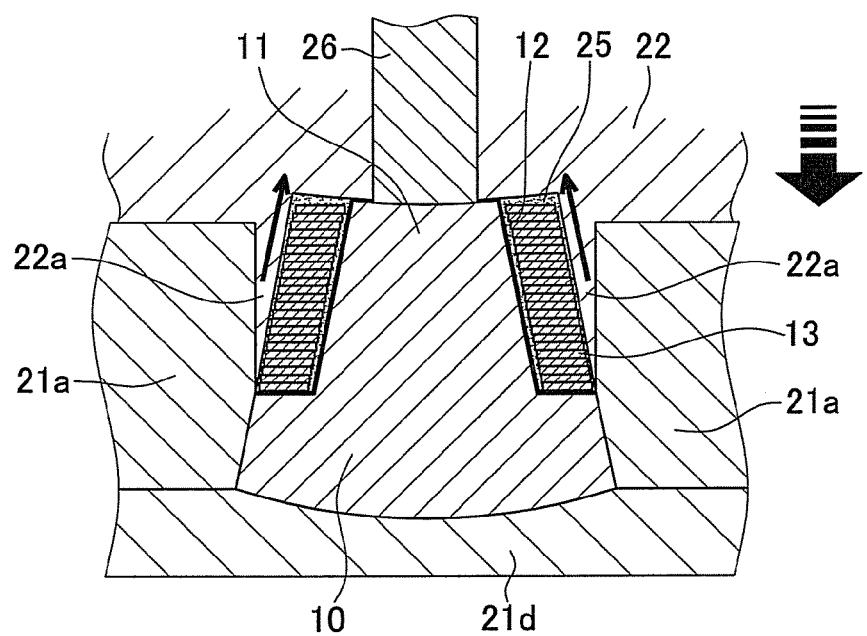
FIG. 7 is a view showing a fourth step in the first embodiment of the split stator manufacturing method of the invention.

In a period from 0.05 to 0.12 seconds from the start of injection of the PPS resin 25, as shown in FIG. 6, the coil holding block 20 is moved by 1.5 mm toward the fixed mold 21. In this state, the edgewise coil 13 is vibrated laterally as indicated by arrows A in FIG. 6 by the ultrasonic generating horn 30 through the coil holding block 20. Herein, a vibration time period is as very short as 0.07 seconds and thus the ultrasonic vibration can only apply small oscillations.

Accordingly, the edgewise coil 13 is brought into contact with the insulator 12 set in the fixed mold 21 as shown in FIG. 6.

During this period, the PPS resin 25 is being injected through the injection ports 21e. The PPS resin 25 flows in gaps between the insulator 12 and the edgewise coil 13 while its fluidity is increased by the laterally vibrating edgewise coil 13. Specifically, if the PPS resin 25 having a high viscosity sticks to the surface of the edgewise coil 13, the resin 25 becomes hard to flow. In this embodiment, however, vibration is applied to the PPS 25 in a direction that separates the PPS resin 25 from the surface of the edgewise coil 13. The PPS resin 25 is therefore unlikely to stick to the surface of the edgewise coil 13 and hence the fluidity of the PPS resin 25 is increased.

This makes it possible to reliably fill even the resin having low fluidity such as thermoplastic resin in small gaps between the insulator 12 and the edgewise coil 13.

After a lapse of 0.12 seconds from the injection start of the PPS resin 25, movement of the edgewise coil 13 toward the fixed mold 21 is stopped and simultaneously movement of the movable mold 22 toward the fixed mold 21 is started to perform mold compression. This mold compression is terminated after a lapse of 0.27 seconds from the injection start. In this period, the injection of the PPS resin 25 is stopped after a lapse of 0.20 seconds from the injection start. A clamping pressure of 800 kN is kept for 5 seconds after the end of the mold compression.

After a lapse of 0.12 to 0.27 seconds from the injection start, the PPS 25 is injected until a lapse of 0.20 seconds from the injection start. After a lapse of 0.12 to 0.20 seconds from the injection start, while the PPS resin 25 is being injected, mold compression is performed to fully fill the PPS resin 25 in small gaps between the edgewise coil 13 and the inner surfaces of the protruding portions 22a of the movable mold 22.

It is then waited until the PPS resin 25 is hardened, and thereafter the movable mold 22 is moved upward.

Figure 18:
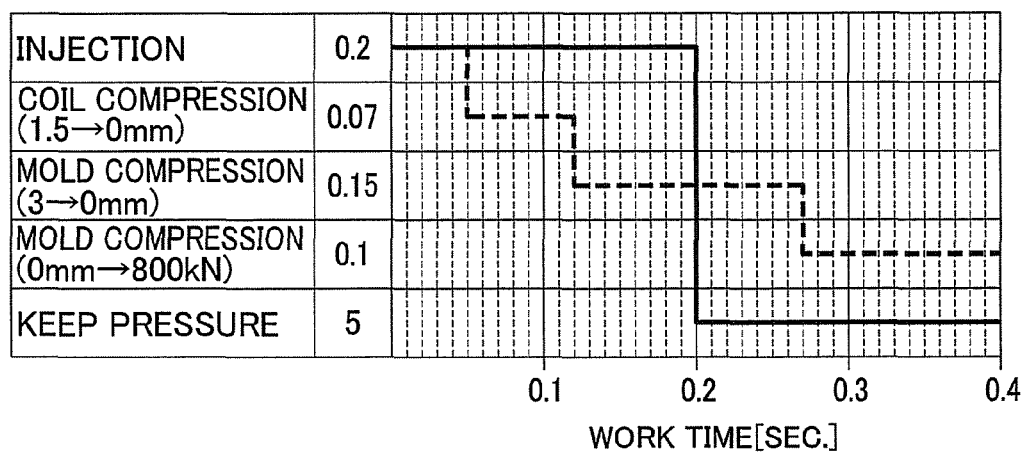
FIG. 18 is a time chart in another example of the first embodiment.

In the embodiment mentioned above, the edgewise coil 13 is laterally vibrated in moving into the PPS resin 25. Alternatively, as shown in a time chart in FIG. 18, the edgewise coil 13 may be moved in the PPS resin 25 without being laterally vibrated.

According to the split stator manufacturing method in the present embodiment, as explained above in detail, in the first step, the core element 10 is set in the fixed mold 21 and the insulator 12 is set on the core element 10. On the other hand, the edgewise coil 13 is set in the movable mold 22.

Successively, while the fixed mold 21 and the movable mold 22 are in the half-open state, injection of molten resin for resin molding into the cavity is started.

Furthermore, a compressing step is conducted to compress the injected resin by only the edgewise coil 13.

In this compressing step, only the edgewise coil 13 can be moved into the molten resin staying in the cavity. This can more reliably fill the PPS resin 25 in small gaps between the insulator 12 and the edgewise coil 13.

In particular, while the molten PPS resin 25 is moved into the edgewise coil 13, the edgewise coil 13 is vibrated in a short-side direction of the coil (i.e., in a direction of moving closer to or away from the insulator 12), thereby changing the gaps between the insulator 12 and the edgewise coil 13. Thus, the PPS resin 25 is allowed to smoothly flow. Since the fluidity of the PPS resin 25 is enhanced, the PPS resin 25 can be more reliably filled in the small gaps between the insulator 12 and the edgewise coil 13. Herein, the edgewise coil 13 is vibrated in the direction that separates the PPS resin 25 from the surface of the edgewise coil 13. Accordingly, the PPS resin 25 is unlikely to stick to the surface of the edgewise coil 13 and hence the fluidity of the PPS resin 25 is increased.

Since the compressing step and the mold clamping step are started in process of the resin injecting step, the edgewise coil 13 is moved into the PPS resin 25 while the PPS resin 25 is being injected. It is consequently possible to more efficiently and more reliably fill resin in small gaps between the insulator 12 and the edgewise coil 13.

A second embodiment will be explained below. The second embodiment is substantially identical to the first embodiment and describes only differences therefrom. The same contents are not explained below.

The second embodiment is directed to a manufacturing method that does not include the step of compressing the PPS resin 25 by only the edgewise coil 13. To be concrete, while the edgewise coil 13 is held in a final position by the coil holding block 20 with respect to the movable mold 22 from the beginning, the movable mold 22 is moved close to the fixed mold 21 to directly perform mold compression.

Figure 17:
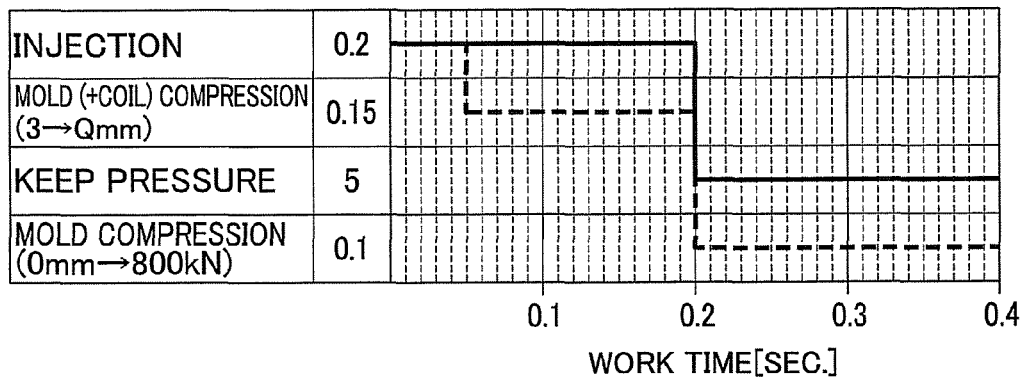
FIG. 17 is a time chart in the second embodiment.

FIG. 17 is a time chart of an injecting step. A total time period of the injecting step is as very short as 0.2 second. The fixed mold 21 and the movable mold 22 have been heated at 150° C. However, the PPS resin 25 which is thermoplastic resin is hardened in short time and thus the total injection time is set to be very short.

Figure 8:
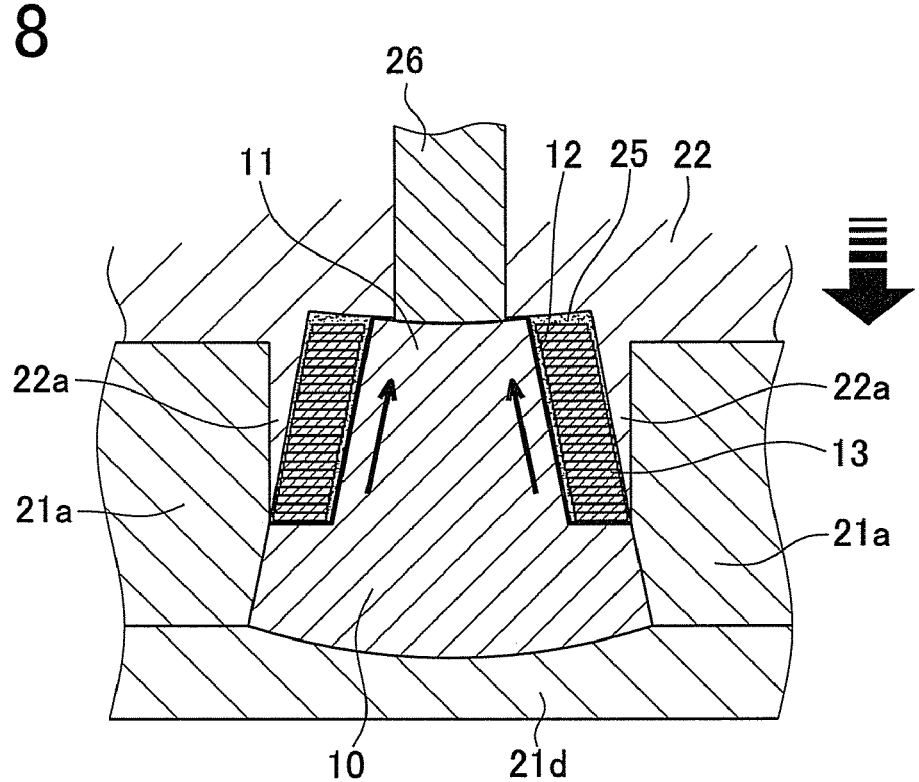
FIG. 8 is a view showing a second embodiment of the split stator manufacturing method of the invention.
Figure 9:
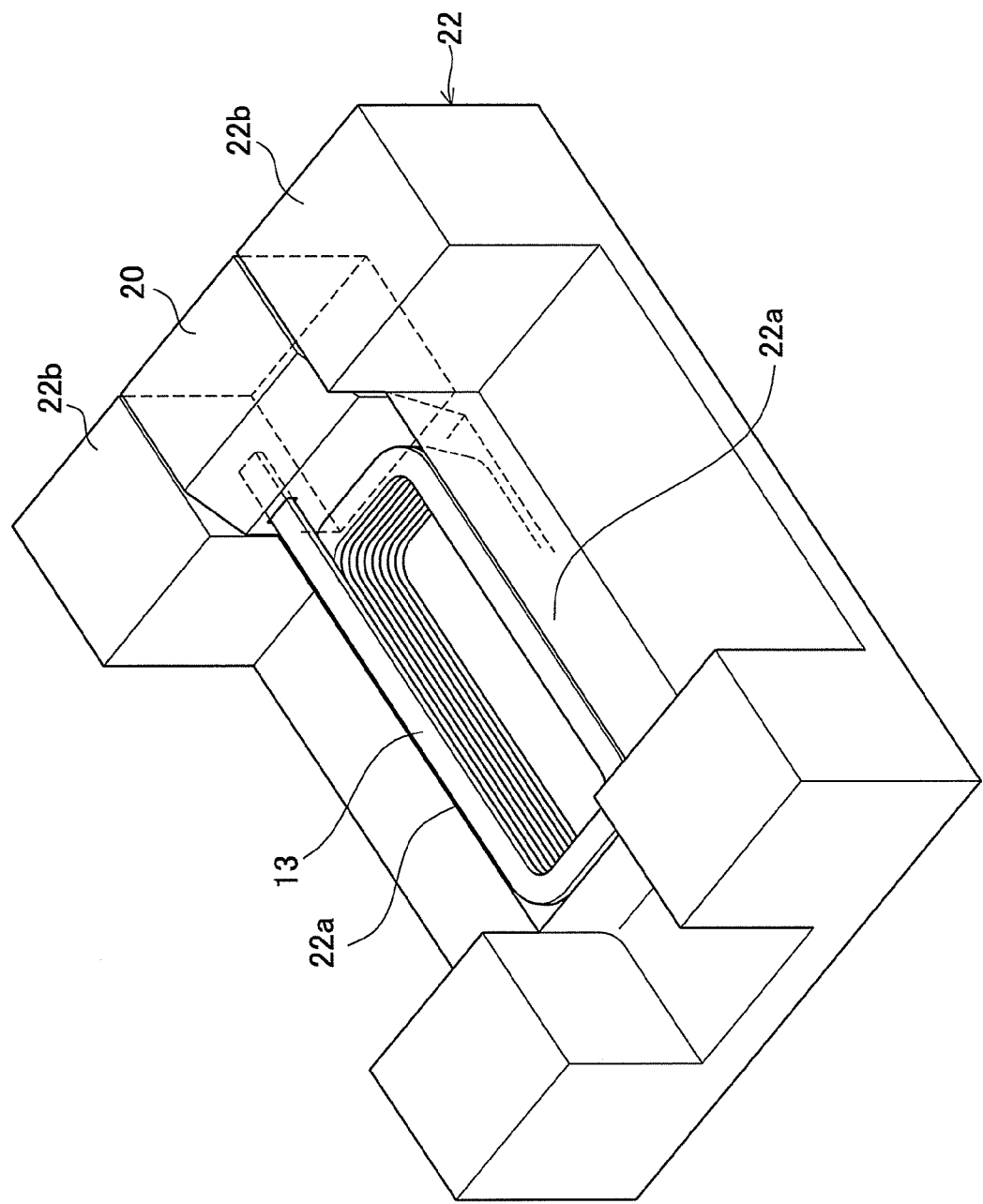
FIG. 9 is a perspective view showing a structure of a movable mold holding an edgewise coil.

After a lapse of 0.05 to 0.20 seconds from the start of injection of the PPS resin 25, as shown in FIG. 8, the movable mold 22 is moved close to the fixed mold 21 to perform mold compression. After a lapse of 0.20 seconds from the injection start, the mold compression and the injection of the PPS resin 25 are stopped at the same time. A clamping pressure of 800 kN is kept for 5 seconds after the end of the mold compression.

After a lapse of 0.05 to 0.20 seconds from the injection start, while the PPS resin 25 is being injected, the mold compression is performed by moving the edgewise coil 13 into the PPS resin 25 injected and accumulated in the cavity. This can cause the PPS resin 25 to move or flow in small gaps between the insulator 12 and the edgewise coil 13.

Simultaneously, the PPS resin 25 is also sufficiently filled in small gaps between the edgewise coil 13 and the inner surfaces of the protruding portions 22a of the movable mold 22.

It is then waited until the PPS resin 25 is hardened, and thereafter the movable mold 22 is moved upward.

According to the second embodiment, as explained above in detail, without adopting a complicated step of first moving the edgewise coil 13 into the PPS resin 25 in the cavity, it is possible to fill the PPS resin 25 in small gaps between the insulator 12 and the edgewise coil 13 to a certain degree.

The molten PPS resin 25 is injected while the fixed mold 21 and the movable mold 22 are in a half-open state. Accordingly, resin injection does not need large pressure and hence no pressurizing device is required.

Since the mold clamping step is started in process of the resin injecting step, the PPS resin 25 is injected while the fixed mold 21 and the movable mold 22 are being clamped. Thus, the PPS resin 25 is caused to more efficiently flow into gaps between the insulator 12 and the edgewise coil 13.

In the case where the PPS resin 25 is injected first and then the mold clamping is performed, the PPS resin 25 is accumulated in the cavity and the coil is moved therein. However, only small gaps finally exist between the insulator and the coil and therefore, in some case, the resin could not flow into upper gaps. In this regard, since the PPS resin 25 is being injected during the mold clamping step, the resin can be reliably filled in small gaps between the insulator 12 and the edgewise coil 13. In particular, the resin injection is preferably continued partway in the mold clamping step.

Since the split stator members 18 are individually shaped, a molding cavity in one injection molding is small in size. Thus, low fluidity resin such as thermoplastic resin can be used directly. A motor for driving a hybrid electric vehicle needs high torque, flows a relatively high voltage, and generates a large amount of heat. Thus, heat conductivity of the resin molded portion has to be enhanced. For this end, additives are added to the resin, resulting in decreased fluidity. It is therefore technically difficult to fill such resin in every corner of the molding cavity, in particular, in the internal space of the wound portion of the coil without gaps.

According to the split stator member of the invention, the volume of the molding cavity is small, so that the resin can be reliably filled in every corner of the internal space of the wound portion of the coil. Thus, the efficient of dissipating the heat from the coil outward through the resin molded portion can be enhanced.

The present invention is not limited to the above embodiments and may be embodied in other specific forms without departing from the essential characteristics thereof.

For instance, the above embodiment describes the core element 10 including one edgewise coil 13. In an alternative, a split stator core element may be configured to have two teeth portions 11 so that two edgewise coils 13 are mounted on the teeth portions 11 respectively, and the entire assembly is coated by resin molding. In another alternative, a split stator core element may be configured to have three teeth portions 11 so that three edgewise coils 13 are mounted on the teeth portions 11 respectively, and the entire assembly is coated by resin molding.

As explained in the above embodiments, the invention may be applied to any formed coils whose winding cross section is of a circular, square, or another shape as well as the edgewise coil mentioned in the embodiments.

The above embodiments explain the case of using thermoplastic resin. As an alternative, the invention may be applied to the case of using heat hardening resin.

The invention claimed is:

1. A split stator manufacturing method comprising the steps of:
   setting an insulator and a split core element in a first mold and setting a formed coil in a second mold;
   moving the second mold toward the first mold to insert the formed coil into the first mold;
   injecting resin in a cavity while the first mold and the second mold are in a half-open state during the insertion of the formed coil; and
   clamping the first and second molds together while keeping fluidity of the resin.

2. The split stator manufacturing method according to claim 1, wherein the resin is thermoplastic resin.

3. The split stator manufacturing method according to claim 1, wherein the clamping step is started in process of the injecting step.

4. The split stator manufacturing method according to claim 3, wherein the resin is thermoplastic resin.

5. The split stator manufacturing method according to claim 1, further comprising:
   compressing the injected resin by the formed coil during the injecting step and the clamping step.

6. The split stator manufacturing method according to claim 5, wherein the resin is thermoplastic resin.

7. The split stator manufacturing method according to claim 5, wherein the formed coil is vibrated in a lateral direction of moving closer to or away from the insulator.

8. The split stator manufacturing method according to claim 7, wherein the resin is thermoplastic resin.

9. The split stator manufacturing method according to claim 5, wherein the compressing step and the clamping step are started in process of the resin injecting step.

10. The split stator manufacturing method according to claim 9, wherein the formed coil is vibrated in a lateral direction of moving closer to or away from the insulator.

11. The split stator manufacturing method according to claim 9, wherein the resin is thermoplastic resin.

* * * * *